July 31, 1951   E. P. BONE   2,562,258
HEADLIGHTING SYSTEM
Filed March 10, 1950

INVENTOR
Evan P. Bone

Patented July 31, 1951

2,562,258

UNITED STATES PATENT OFFICE 2,562,258

HEADLIGHTING SYSTEM

Evan P. Bone, Cincinnati, Ohio

Application March 10, 1950, Serial No. 148,809

9 Claims. (Cl. 315—83)

1

The invention pertains to headlighting, particularly to motor vehicle headlighting on rural roads. The principal object is to project, automatically, a non-glare shadow from one vehicle toward its opposing vehicle when two vehicles meet. As the subject vehicle upon which the headlighting improvement of this invention is mounted, approaches and passes an opposing vehicle, the non-glare shadow automatically moves along with the opposing vehicle with the further object of not otherwise molesting the full brightness of the headlighted roadway straight ahead of the course of travel of subject vehicle.

The non-glare shadow is produced by the front lens of the headlamp, it being an image-producing lens in the optical sense. An opaque or translucent screen is located at or near the rear principal focus of the lens so that the real image of the screen as projected by the lens forms the non-glare shadow ahead, similar in principle to that of a magic lantern. The screen, and therefore the shadow, can be designed in any shape and size to best cover the eyes of the driver of the opposing vehicle. The shadow is caused to move along with the successive positions of the opposing vehicle by a conjugate movement of the screen across or near the rear focal plane of said lens. The position of the screen is automatically controlled by a direction finder mounted on the subject vehicle. The direction finder is actuated by light or other radiation coming from the opposing vehicle and regulates the amount of electric current flowing through a photo-electric cell according to the angle of arc between the longitudinal axis of the subject vehicle and the direction from subject vehicle to the opposing vehicle. Thereby the non-glare shadow is projected in a direction toward the opposing vehicle from whence the radiation which actuates the direction finder is coming.

Figure 1:
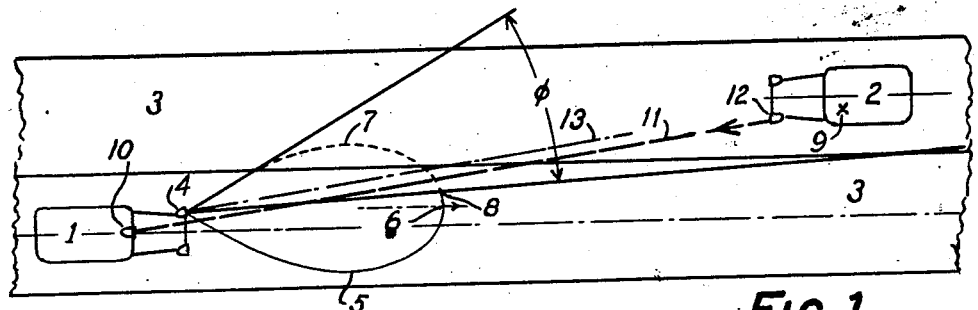
Fig. 1 is a plan view of a roadway showing the operation of the headlight control system of this invention, as two opposing vehicles meet.
Figure 2:
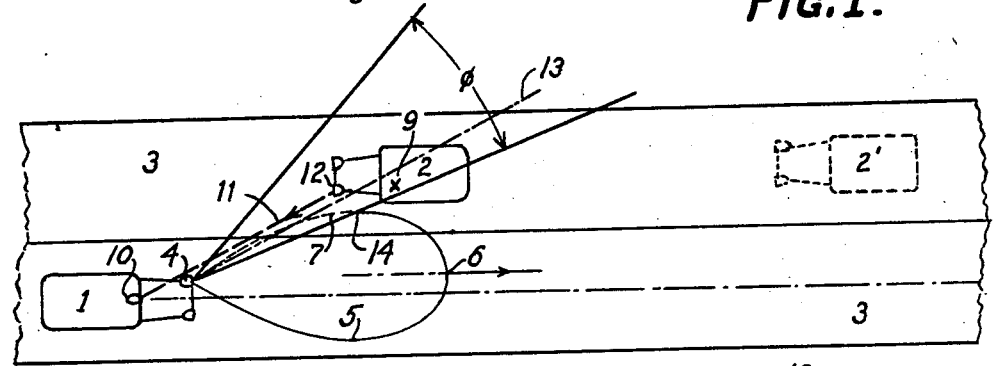
Fig. 2 is a similar plan view showing the operation after the two meeting vehicles have approached within closer range.

The headlighting plan of this invention is shown by Figs. 1 and 2 in which the numeral 1 represents the subject vehicle equipped with the system for dirigibly projecting the non-glare shadow and the numeral 2 represents an opposing vehicle in the adjacent lane of the highway 3. The headlamp 4 mounted on subject vehicle 1 projects a beam of light, when on clear road, the candle power distribution of which is shown by the distribution curve 4 5 6 7 4, the maximum

2 candle power 6 being directed straight ahead of the course of travel. Whenever an opposing vehicle 2 approaches within range as illustrated in Fig. 1, the headlamp 4, of subject vehicle 1, automatically projects a non-glare shadow within the angle $\phi$, the shadow being superposed on the beam 4 5 6 7 4, to alter the bounds of the candle power distribution of the headlight beam to 4 5 6 8 4. Thus the driver located at 9, in the opposing vehicle 2, being within the limits of non-glare shadow $\phi$, is protected from the glare of headlamp 4, but the maximum intensity of the headlight beam in the direction of 6, straight ahead of the course of travel, is not materially molested.

The direction finder 10 is mounted at a convenient location on subject vehicle 1, but preferably higher than the eye level of the driver of subject vehicle 1. The rays of light represented by broken line 11, from headlamp 12, or other source of radiation on opposing vehicle 2, to direction finder 10, causes a photo-electric current, in the manner as hereinafter described, to control the orientation of non-glare shadow $\phi$, to keep the reference line, or asymmetrical axis 4 13, of shadow $\phi$ essentially parallel with the rays of light 11, from 12 to 10.

Fig. 2 shows the situation when the two vehicles 1 and 2, have approached within closer range, the relative position of the opposing vehicle having moved from 2' to 2. The rays of light 11, from source 12 of opposing vehicle 2, to the direction finder 10 of subject vehicle, now actuates the direction finder to cause the axis 4 13, of the non-glare shadow $\phi$, to maintain its parallelism with the direction of the light rays 11, from 12 to 10, so that the candle power distribution of the beam pattern from subject headlamp 4 has now changed to 4 5 6 14 4. This provides the driver of subject vehicle 1 with fuller illuminated scope of vision from his headlamp 4 and the driver located at 9, in opposing vehicle 2, is still within the shadow $\phi$ and thereby protected from glare.

Figure 3:
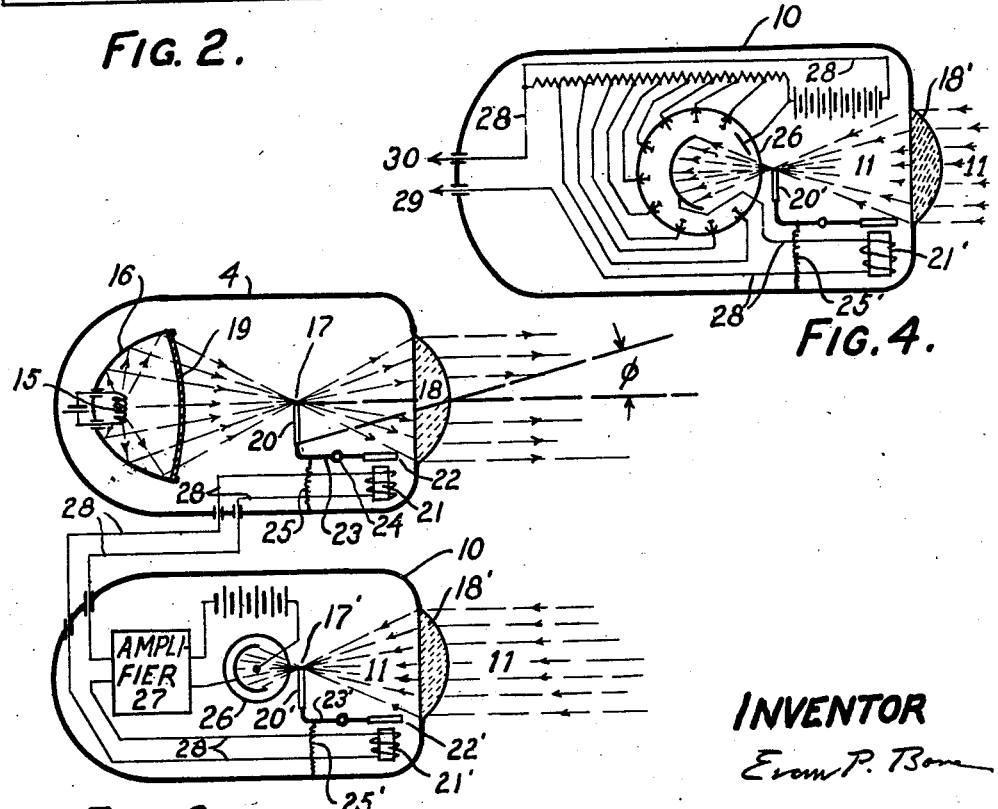
Fig. 3 is a sectional view on horizontal plane showing the combination of headlamp and direction finder.

As illustrated in Fig. 3, the headlamp 4, operates upon the same optical principle as the headlamp disclosed in my U. S. Patent No. 1,389,291 (1921). The light source 15, such as an incandescent filament, is located at the rear focus of an ellipsoid reflector 16, so that the light intercepted and re-directed by said ellipsoid reflector 16, is concentrated at its forward focal point 17. The point 17 is also the rear principal focus of lens 18 so that the light concentrated by the reflector 16 at the focal point 17, passing on through lens 18 is refracted toward parallelism in forming the projected headlight beam.

The size and shape of the filament 15, formations on the surface of basic ellipsoid reflector 16 and/or formations on the cover glass 19, can be purposely designed to deviate the light rays slightly from the geometric focus 17, as they pass the principal focal plane of lens 18 containing point 17, to form a pattern, in miniature, of the desired headlight beam pattern. The real image projected by lens 18, of this miniature pattern of light distribution over its rear principal focal plane, forms the headlight beam pattern such as outlined in horizontal plane by 4 5 6 7 4, in Figs. 1 and 2. The screen 20, is disposed to move in the principal focal plane and block off a portion of the light distribution pattern. The real image of screen 20, as projected by lens 18, forms the non-glare shadow φ, indicated in Figs. 1 and 2.

The desired movement of screen 20 is produced by the magnetic attraction between electromagnet 21 and armature 22. The armature 22 and screen 20 are fixedly attached to opposite ends of lever arm 23 which is pivoted at 24. The spring 25 acts to restrain the movement of the lever arm 23 and screen 20 so that the position of the screen depends upon the strength of the electromagnet 21.

The strength of electromagnet 21 and therefore the position of screen 20 is controlled by direction finder 10, which contains a lens 18', screen 20', electromagnet 21', spring 25', and appurtenances identical with, or similar to, the corresponding parts of headlamp 4. Radiation or waves coming from opposing vehicle 2, for instance, the bundle of light rays 11 from headlamp 12, are received by the direction finder 10 through its lens 18', and concentrated near point 17', the conjugate focus of headlamp 12, at which point the rays cross and then are collected by phototube 26. The resulting photoelectric current is amplified by amplifier 27. The amplified current conducted through circuit 28, energizes electro-magnet 21', to attract armature 22', which tends to pull screen 20', at the other end of lever arm 23', into the small area of the concentrated light rays 11, around point 17'. When the screen 20' encroaches sufficiently into the small area of light 11 to cut off some light from reaching phototube 26, thereby decreasing the photoelectric current to weaken electromagnet 21', the spring 25' tends to pull the screen away from the light 11. The result is that a balance is reached in which the edge of screen 20' takes a position near point 17' to permit just enough light to reach the phototube 26 to cause just enough current for holding the edge of screen 20' approximately in said position.

The electromagnet 21 of headlamp 4 also is connected in, or to, circuit 28, the same as electromagnet 21', so that the screen 20 of headlamp 4 is held in a position corresponding to that of screen 20' of direction finder 10. Relative adjustments of screens 20' and 20 cause the shadow φ, formed by screen 20, to be oriented in the same direction as the direction from finder 10 to the headlight 12 on vehicle 2 (Figs. 1 and 2). A certain overlapping of screen 20 beyond its geometric axis, said axis corresponding to the edge of screen 20', is made for the purpose of compensating for the lateral separation of headlamp 4 and direction finder 10 on vehicle 1 and also of headlamp 12 and position 9, of the driver of vehicle 2.

In the preceding description of the operation of the direction finder in connection with the headlamp screen 20, the two vehicles 1 and 2 were assumed to be stationary. As the vehicles approach each other, and their relative positions change, the position of point 17', being the conjugate focus of headlamp 12 of opposing vehicle 2, also changes. As the position of focal point 17' thus changes, the screen 20' changes also, to keep its edge approximately at the point 17' by reason of the balancing action just described. When the position of screen 20' changes position, the tension in spring 25' must change and also the current in the winding of electromagnet 21' must change in order to maintain the balance. Thus the position 17' of the concentrated light 11 determines the strength of the current in circuit 28 which includes the windings of both electromagnets 21 and 21' to hold screens 20 and 20' in synchronous positions. The final result is that the non-glare shadow φ, which is the optical image of screen 20, coincides with the opposing vehicle 2 from whence comes the radiation which actuates direction finder 10.

Figure 4:
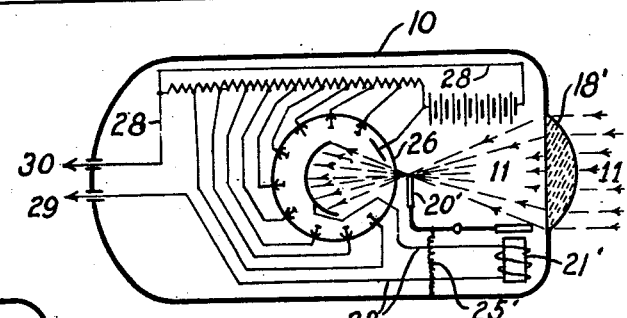
Fig. 4 is a sectional view on horizontal plane showing a form of direction finder operated by the use of a multiplier phototube.

By use of a multiplier type phototube 26 in the direction finder 10, as shown in Fig. 4, the magnets 21' and 21 can be operated without an amplifier. The terminals 29 and 30 lead to the magnet 21 in the headlamp 4.

For the purpose of illustration, the electrical power supplies are shown as batteries. In actual use conventional equipment such as a vibrator and transformer operated from the vehicle generator and storage battery system is preferable for the phototube supply.

For clearness in explaining the principles involved, the means for moving the screens 20' and 20 are shown in the figures as simple electromagnets. Permanent-magnet-moving-coil type indicators as generally used in voltmeters and ammeters, other types of galvanometers or electric motors are preferable.

The figures are shown with only the one headlamp 4 or subject vehicle 1 in operation in order to avoid confusion of lines on the diagrams. The circuit 28 can be extended to the two or more headlamps with which the vehicle may be equipped so both or all headlamps operate in the same manner as shown and described for headlamp 4.

The source of radiation for operating the direction finder is shown as the light from a headlamp of the opposing vehicle. This is preferable in order that the system can function when meeting vehicles with conventional headlamps as encountered on the roads at the present time. The headlamp 4 can be operated from a direction finder actuated by forms of electromagnetic radiation other than visible light or by audible or supersonic vibrations coming from the opposing vehicle. If the time comes when all vehicles using the highways are equipped with uniform systems of glare control, similar to the system described herein, the direction finder could be operated more easily by ultra violet or infrared light from opposing vehicles.

In the form of the invention illustrated in the drawings, the direction as found by the direction finder, is initially indicated by the point or small area 17' at which the incoming rays come to a focus, the reference line being the principal axis of lens 18'. Then the phototube 26, electro-magnet 21', armature 22', lever 23', spring 25' and screen 20' all combine to form a governor in the general sense. The combination may include amplifier 27. In the governing action, the screen 20' serves to throttle the light entering photo-tube 26 and thereby regulate the photo-tube current to which the power fed to the headlamp beam control is proportional. It is like the governor of a steam engine, for example, where the power output is regulated by a valve which throttles the flow of steam, except that, in a steam engine, the valve opening is piloted by the speed of the engine whereas in the subject headlighting system, the valve opening is piloted by the location of the area 17' at which the rays of incoming light are focused.

While the headlamp 4 may be termed a dirigible beam headlamp, it is not to imply that the lamp structure as a whole changes its aiming but rather that the rays of light are redistributed for a change in the general direction of the projected beam. In the beam shown in Fig. 1, the screen 20 has encroached into the light within the lamp structure 4, to superimpose the non-glare shadow $\phi$ on the normal beam distribution causing the preponderance of light from the headlamp to be projected toward the right lane of the roadway 3. In Fig. 2, the screen 20 has changed in accordance with the power received through circuit 28, to move the non-glare shadow $\phi$ toward the left so that the general direction of the projected light has moved nearer the center of highway 3.

I claim as my invention:

1. A headlighting system including a headlamp comprising an ellipsoidal reflector, a source of light at the rear focus of said reflector, a lens having its rear principal focus approximately coincidental with the forward focus of said reflector, a laterally movable screen near the forward focus of the reflector and electromagnetic means for moving said screen; a direction finder comprising a lens, a laterally movable screen near its rear principal focus, a phototube rearwardly thereof and electromagnetic means for moving said screen; and an electrical circuit, connectable to a source of voltage, including said phototube and both said electromagnetic means.

2. A headlighting system including a headlamp comprising an ellipsoidal reflector, a source of light at the rear focus of said reflector, a lens having its rear principal focus approximately coincidental with the forward focus of said reflector, a laterally movable screen near the forward focus of the reflector and electromagnetic means for moving said screen; a direction finder comprising a lens, a laterally movable screen near its rear principal focus, a phototube rearwardly thereof, an amplifier connected with said phototube and electromagnetic means for moving said screen; and an electrical circuit from said amplifier including both of said electromagnetic means.

3. A direction finder, mountable on a motor vehicle, said direction finder comprising a photoelectric cell adapted to regulate its photoelectric current in accordance with the direction of light received from an opposing vehicle, a headlamp, mountable on said motor vehicle, comprising a movable screen near the rear principal focus of a projection lens in the headlamp and electrical means actuated by said photoelectric current, for moving said screen.

4. A direction finder mountable on a motor vehicle, said direction finder comprising a photoelectric cell adapted to regulate its photoelectric current in accordance with the direction of light coming from an opposing vehicle, a headlamp mountable on said motor vehicle, comprising a movable screen near the rear principal focus of a projection lens in the headlamp and electrical means actuated by said photoelectric current, for moving said screen, said direction finder and said headlamp being mutually adjustable for maintaining the alignment of said screen with the optical center of said lens in the same direction as the direction of light coming from said opposing vehicle.

5. In a headlighting system, a lens disposed to concentrate light coming from an opposing vehicle at a focal point, a photocell located to intercept light which passes said focal point, magnetic means actuated by current from said photocell and a restrained movable screen located to be moved by said magnetic means into a position in which an edge of the screen coincides with said focal point; and a headlamp comprising an image forming lens and a similarly restrained movable screen moved by magnetic means actuated by said photoelectric current, both screens being pre-aligned so that imaginary lines from corresponding edges of both of said screens passing through the optical centers of their associated lenses are maintained essentially parallel.

6. A headlight system comprising a direction finder, having a lens disposed to focus rays of light coming from an opposing vehicle, at a location approximately in the focal plane of said lens, said location being the conjugate focus of the source of light, thereby serving to indicate the relative direction of the incoming rays of light; an electrically controlled dirigible beam headlamp; a conductor of electricity connectable to a source of voltage, leading from said direction finder to the beam control of said headlamp; and an electronic governor of the electric power conducted to said beam control, said governor including a photocell and a screen which is movable by the photocell current and is disposed to throttle the light entering said photocell in accordance with the said location of the focused rays of light coming from said opposing vehicles.

7. A headlamp system comprising a direction finder having means for concentrating incoming radiation at a location to indicate the direction of said radiation; an electrically controlled dirigible beam headlamp; an electrical conductor, connectable to a source of voltage, leading from said direction finder to said headlamp; and an electronic governor of the electrical power conducted to said headlamp, said governor including a photocell and a screen which is movable by the photocell current and is disposed to throttle the radiation entering said photocell in accordance with the said location of concentrated radiation.

8. A headlighting system comprising a direction finder; an electrically controlled dirigible beam headlamp; a conductor connectable to a source of voltage, leading from said direction finder to said headlamp; and a governor actuated by said direction finder, said governor being disposed to throttle the flow of electricity to said headlamp in accordance with the direction indicated by said direction finder.

9. A headlighting system comprising a direction finder; a power controlled dirigible beam headlamp; power transmission means connectable to a source of power, leading from said direction finder to said headlamp; and a governor actuated by said direction finder, said governor being disposed to throttle the power transmitted to said headlamp in accordance with the direction indicated by said direction finder.

EVAN P. BONE.

REFERENCES CITED

The following references are of record in the file of this patent:

UNITED STATES PATENTS

| Number | Name | Date |
|---|---|---|
| 1,389,251 | Type | Aug. 30, 1921 |
| 1,761,811 | Bone | June 3, 1930 |